United States Patent [19]

Gruber et al.

[11] Patent Number: 4,463,126

[45] Date of Patent: Jul. 31, 1984

[54] COATINGS PREPARED FROM PREPOLYMERS AND AROMATIC DIAMINES HAVING AT LEAST ONE ALKYL SUBSTITUENT IN AN ORTHO POSITION TO EACH AMINO GROUP

[75] Inventors: Hermann Gruber, Leverkusen; Wolfgang Wellner, Cologne, both of Fed. Rep. of Germany

[73] Assignee: Bayer Aktiengesellschaft, Leverkusen, Fed. Rep. of Germany

[21] Appl. No.: 461,339

[22] Filed: Jan. 27, 1983

[30] Foreign Application Priority Data

Feb. 3, 1982 [DE] Fed. Rep. of Germany ....... 3203490

[51] Int. Cl.³ .............................................. C08G 18/10
[52] U.S. Cl. ..................................... 524/589; 427/136; 427/393.6; 428/425.5; 524/590; 528/64
[58] Field of Search ............... 528/64; 427/136, 393.6; 428/425.5; 524/589, 590

[56] References Cited

U.S. PATENT DOCUMENTS 3,428,610  2/1969  Klebert ................................. 260/79
3,931,115  1/1976  Strassel ................................. 528/64
4,218,543  8/1980  Weber et al. ......................... 521/51

OTHER PUBLICATIONS

"Rissüberbruckende Kunststoffbeschichtungen fur mineralische Baustoffe" by Gunter Rieche, Otto–Graf-Institut Stuttgart, Farbe und Lack, publishers Kurt Vinzenz Verlag, Hanover, Year 85, pp. 824–831, 1979.

"Polyurethane für Beschichtungen und Abdichtungen im Bauwesen", Hermann Gruber, Farbe und Lack, publishers Verlag Vinzenz, Hanover, Year 80, pp. 831–837.

*Primary Examiner*—Maurice J. Welsh
*Attorney, Agent, or Firm*—Gene Harsh; Lawrence S. Pope; Aron Preis

[57] ABSTRACT

The present invention relates to a process for the preparation of coatings using a coating compound based on a system comprising (i) an isocyanate prepolymer based on isophorone diisocyanate and polyalkylene ether polyols having a hydroxyl functionality of 2 to 3 and (ii) at least one diprimary aromatic diamine having at least one alkyl substituent with 2 to 3 carbon atoms in an ortho-position to each amino group.

4 Claims, No Drawings

COATINGS PREPARED FROM PREPOLYMERS AND AROMATIC DIAMINES HAVING AT LEAST ONE ALKYL SUBSTITUENT IN AN ORTHO POSITION TO EACH AMINO GROUP

FIELD OF THE INVENTION

The invention concerns a process for the preparation of a coating compound and, more particularly, to the preparation of a coating comprising an isocyanate prepolymer.

BACKGROUND OF THE INVENTION

Both rendered and bare building constructions of mineral building materials such as those based on concrete or brick must, in many cases, be covered with a dense, firmly adhering coating to prevent corrosion of the building materials or of the reinforcing steel. Coatings are also required when chemical attack on the building material is to be expected or where structures such as floors, storage tanks and concrete containers need to be reliably sealed.

The film of coating must have sufficient elasticity to maintain the seal even if cracks form in the substrate, i.e., it should be capable of bridging over the cracks. The protective function of the coatings is ensured only if the coating films are sufficiently elastic and form a layer of sufficient thickness. These factors have been indicated in the literature (see, for example, "Rissüberbrückende Kunststoffbeschichtungen für mineralische Baustoffe" by Günter Rieche, Otto-Graf-Institut Stuttgart, Farbe und Lack, publishers Kurt Vinzenz Verlag, Hanover, Year 85, pages 824–831, 1979).

The coatings are generally required to have a minimum thickness of 0.1 mm and the coating materials should have a minimum elongation of 100%.

When choosing a coating material, it should be noted that the surfaces to be coated are generally porous and frequently contain a certain quantity of water, the so-called physically associated moisture being assumed to be approximately 3.5% by weight. In many cases, especially when applying coatings outdoors, the water content is found to be considerably higher, and this is bound to lead to interactions with the coating material.

Solvent-free polyurethane systems are the obvious choice for the desired thick-layered elastic coatings since the polyisocyanates and polyalcohols used as starting materials for the polyurethane coatings can be selected as required to provide elastic coating films of any thickness. Difficulties arise however in that the isocyanate groups not only react with polyalcohols but also enter into competitive reaction with the moisture of the underlying surface. This has the undesirable effect of splitting off carbon dioxide which causes the coating material to foam up and form blisters. Numerous proposals have been made aimed at the suppression of this undesirable side reaction. The addition of molecular sieve zeolites has proved to be particularly effective for removing any troublesome water content in the fillers, pigments or other constituents of the coating materials so that water derived therefrom will not cause blistering (see, for example, "Polyurethane für Beschichtungen und Abdichtungen im Bauwesen", Hermann Gruber, Farbe und Lack, Publishers Verlag Vinzenz, Hanover, Year 80, pages 831–837, 1974).

The "molecular sieve zeolite method" cannot however meet the demands of excessive subsurface moisture with the result that the formation of blisters due to the splitting off of carbon dioxide cannot be prevented with certainty when the coating is applied to moist substrates.

The present invention provides a new process for the production of coatings and enables thick, elastic coatings to be applied, in particular to mineral based building materials containing water, which would reliably prevent the undesirable formation of blisters even in the presence of a high content of subsurface moisture, and for which solvent-free or low solvent coating compounds of low viscosity and sufficiently long pot life could be used.

This problem could be solved by the process according to the invention described in detail below.

SUMMARY OF THE INVENTION

The present invention relates to a process for the production of elastic coatings by coating any substrates with a solvent-free or low solvent coating composition, containing, as binder, a two-component system of (i) a polyisocyanate component and (ii) a hardener component, characterized in that (i) has an isocyanate content of from 1 to 20% by weight and consists of at least one prepolymer containing free isocyanate groups based on -1-isocyanato-3,3,5-trimethyl-5-isocyanatomethylcyclohexane and one or more polyalkylene ether polyols having an (average) hydroxyl functionality of from 2 to 3, or of a mixture of at least one such isocyanate prepolymer with up to 500 isocyanate equivalent percents, based on the isocyanate groups of the prepolymer, of at least one other di- or triisocyanate having aliphatically or cycloaliphatically bound isocyanate groups, (ii) consist to an extent of at least 50 equivalent percents of polymines selected from the group consisting of (a) at least one diprimary aromatic diamine having at least one alkyl substituent with 2 to 3 carbon atoms in an ortho-position to each amino group and optionally also methyl substituents in further ortho-positions to the amino groups, (b) reaction products of such diamines with a sub-equivalent amount of either a prepolymer containing free isocyanate groups based on an organic diisocyanate having a molecular weight of from 168 to 300 and at least one polyalkylene ether polyol having an (average) hydroxyl functionality of 2 to 3 or of a mixture of such a prepolymer, of up to 500 isocyanate equivalent percents, based on the isocyanate groups of said prepolymer with said diisocyanate and (c) mixtures of (a) and (b) and to an extent of up to 50 equivalent percents of dihydric or trihydric alcohols having primary hydroxyl groups and in that (i) and (ii) being used in quantitative proportions corresponding to an $NCO/NH_2$ equivalent ratio in the range of from 0,5:1 to 1,5:1.

DETAILED DESCRIPTION OF THE INVENTION

Essential to the process of the invention is the use of new two-component binders consisting of an isocyanate component (i) and a hardener component (ii).

Isocyanate component (i) has an isocyanate content of from 1 to 20% by weight, preferably from 2 to 10% by weight. Isocyanate component (i) comprises either a prepolymer based on 1-isocyanato-3,3,5-trimethyl-5-isocyanatomethylcyclohexane and polyether polyols or polyether polyol mixtures having an (average) OH functionality of from 2 to 3 and an (average) molecular weight, calculated from the functionality and the hydroxyl content, of from 500 to 4000, preferably from 1000 to 3000, or mixtures of said prepolymer having up to 500, preferably up to 300, isocyanate equivalents percent, based on the isocyanate groups of the prepolymer, with other organic polyisocyanates having aliphatically and/or cycloaliphatically bound isocyanate groups.

Preparation of the isocyanate prepolymers is carried out in a known manner by the reaction of IPDI with subequivalent quantities of polyether polyols or polyether polyol mixtures having an (average) hydroxyl functionality of 2 to 3 and an (average) molecular weight, calculated from the hydroxyl functionality and hydroxyl content, of from 500 to 4000, preferably from 1000 to 3000, observing an NCO/OH equivalent ratio in the range of from 1.5:1 to 7:1, preferably from 2:1 to 4:1. When using an IPDI excess above 2:1 in this reaction, mixtures of prepolymers with free IPDI are obtained, which are also suitable as isocyanate component for the process according to the invention. The isocyanate component (i) used in the process according to the invention may also consist of mixtures of prepolymers of the type mentioned above with up to 500 isocyanate equivalents percent, preferably up to 300 isocyanate equivalents percent, based on the isocyanate groups of the prepolymer, of other organic polyisocyanates having aliphatically and/or cycloaliphatically bound isocyanate groups such as, for example, 4,4'-diisocyanato-dicyclohexylmethane, hexamethylene diisocyanate, tris-(isocyanatohexyl)biuret and/or tris-(isocyanatohexyl)-isocyanurate, but this is less preferred than the use of pure prepolymers or their mixtures with excess IPDI.

Suitable polyalkylene ether polyols for the preparation of the prepolymers include the known compounds used in polyurethane chemistry such as alkoxylation products, in particular ethoxylation and/or propoxylation products of di- and/or trifunctional starter molecules such as water, ethylene glycol, 1,2-dihydroxypropane, trimethylolpropane or glycerol. Polyether polyol mixtures, obtained by the alkoxylation of starting mixtures having an average hydroxyl functionality of 2 to 3 and containing compounds with more than 3 hydroxyl groups (such as pentaerythritol) may also be used. Preferred polyether polyols include polypropylene glycol and/or propoxylated trimethylolpropane within the abovementioned (average) molecular weight range. The hardener component (ii) which is essential to this invention may be (a) at least one diprimary aromatic diamine having at least one alkyl substituent with 2 to 3 carbon atoms in an ortho-position to each amino group and optionally also methyl substituents in other ortho-positions to the amino groups. These compounds have a molecular weight of from 178 to 346. Typical examples of such aromatic diamines include 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diamino-diphenylmethane, 3,5,3',5'-tetraisopropyl-4,4'-diamino-diphenylmethane, 3,5-diethyl-3',5'-diisopropyl-4,4'-diamino-diphenylmethane and any mixtures of such diamines.

The hardener component (ii) which is essential to this invention may also be (b) the reaction product of at least one such aromatic diamine with a subequivalent amount of a NCO-prepolymer or with a mixture of NCO-prepolymer with up to 500 equivalent percents, based on the isocyanate groups of the NCO-prepolymer of an organic diisocyanate having a molecular weight of from 168 to 300. The NCO-prepolymer may be the reaction product of a polyether polyol or polyether polyol mixture of the kind disclosed hereinbefore with any organic diisocyanate having a molecular weight of from 168 to 300 such as hexamethylene diisocyanate, IPDI, 2,4- and/or 2,6-diisocyanato toluene, 4,4'-diisocyanato-diphenylmethane or 4,4'-diisocyanato-dicyclohexane observing an NCO/OH equivalent ratio in the range of from 1,5:1 to 7:1, preferably from 2:1 to 4:1. If an excess greater than 2:1 is used a mixture of prepolymer with the diisocyanate is formed. The reaction product of the diamine with the NCO-prepolymer resp. mixture of NCO-prepolymer with diisocyanate is preferably obtained by simply bringing the reactants together at room temperature at an equivalent ratio between amino groups and NCO-groups of from 1,5:1 to 20:1 preferably of from 3:1 to 8:1. This can be done in the presence of additives which are inert towards amino and isocyanate groups and which are commonly used in coating compositions. After combination of the reactants the mixtures are stored at room temperature until the reaction is completed (e.g. from 10 to 30 minutes). If an excess of amine is used which is greater than 2:1 mixtures (c) of free amine and reaction product are obtained which may be used as component (ii). The hardener component (ii) may also comprise up to 50 equivalent percents, based on all the isocyanate reactive groups present in the mixture of dihydric or trihydric, preferably dihydric alcohols having primary hydroxyl groups, e.g., ethylene glycol, diethylene glycol, triethylene glycol or other polyether polyols of the above-mentioned functionality containing (primary) hydroxyethyl end groups and having an (average) molecular weight of up to 6000. The use of hardener mixtures of this type is, however, less preferred than the use of pure aromatic diamines or diamine mixtures.

Components (i) and (ii) which are essential to this invention are used in such quantities when carrying out the process according to the invention that the equivalent ratio of isocyanate groups of component (i) to amino groups of component (ii) is in the range of from 0.5:1 to 1.5:1, preferably from 0.9:1 to 1.1:1. When using the less preferred mixtures mentioned above as hardener component (ii), the NCO/NH$_2$ equivalent ratio is preferably kept below 1:1, the ratio being dependent on the proportion of polyol component, in the hardener mixture, so that the total ratio of isocyanate groups to all isocyanate reactive groups is approximately in the range of 0.9:1 to 1.1:1.

It is frequently advantageous if, in addition to the binder components (i) and (ii), there are incorporated, in the coating compounds to be used according to the invention, from 0.1 to 5% by weight, preferably from 0.5 to 2% by weight, of organic, preferably cycloaliphatic carboxylic acid anhydrides, in particular dicarboxylic acid anhydrides such as hexahydrophthalic acid anhydride or methyl hexahydrophthalic acid anhydride, which results in a marked improvement in the rate of hardening without adversely affecting the pot life of the coating compounds.

The coating compounds to be used according to the invention may also contain the usual auxiliary agents and additives employed in coating technology.

Thus, the coating compounds may contain, for example, up to 15% by weight, based on the total weight of coating compounds, of conventional lacquer solvents such as toluene, xylene, butyl acetate and/or ethylene glycol monoethylether acetate although the use of solvent-free coating compounds is preferred according to the invention.

Other auxiliary agents and additives which may optionally be used include, e.g., pigments, fillers plasticisers such as e.g. coal tar and levelling agents. It is generally not necessary to add the usual catalysts which accelerate isocyanate addition reactions since the coating compounds to be used according to the invention have a sufficiently high reactivity in the absence of such catalysts.

The coating compounds having the composition described above and to be used according to the invention generally have a viscosity at 23° C. of from 1000 to 20,000 mPa.s and a pot life of approximately 5 to 60 minutes.

They may be used by the usual methods of coating technology for coating any substrates. The preferred field of application of the coating compounds to be used according to the invention is the coating of mineral building materials which are frequently moist, e.g., the coating of concrete constructions or of brick work. The special advantage of the process according to the invention lies in the fact that when coating such moist mineral substrates, highly elastic, homogeneous coatings, i.e., coatings free from blisters are obtained. The process according to the invention is suitable, in particular, for the production of thick coatings on such substrates, i.e., coatings having a dry film thickness of from 0.2 to 5 mm.

The process according to the invention is further illustrated in the following examples.

EXAMPLES

The following isocyanate components are used in the examples given below:

Isocyanate component A:

1000 g of isophorone diisocyanate are added to 4000 g of a polypropylene glycol ether having an average molecular weight of 2000 obtained by the propoxylation of 1,2-dihydroxypropane, and the mixture is reacted at 100° C. to produce a mixture of prepolymers and free IPDI corresponding to the above-mentioned starting materials and containing isocyanate groups amounting to an isocyanate content of 4% by weight. The mixture obtained is a clear liquid having a viscosity of 5 Pas/23° C. The mixture contains no gel particles and is suitable for use as isocyanate component for a solvent-free coating compound.

Isocyanate component B: (Comparison)

750 g of 2,4-diisocyanatotoluene are added to 4000 g of a polypropylene glycol ether having an average molecular weight of 3000 which has been obtained by the propoxylation of trimethylolpropane, and the components are reacted together at 100° C. to produce an isocyanate prepolymer having an isocyanate content of 3.5%. A clear liquid having a viscosity of 8 Pas/23° C. is obtained.

EXAMPLE 1

A concrete panel measuring 50×20×1.5 cm is immersed in water and after it has been left to allow the water to drip off, a mixture of 200 g of isocyanate component A and 13.5 g of 1-methyl-3,5-diethyl-2,4-diaminobenzene is poured over the panel. The mixture has a working life of ca. 30 minutes which is sufficient for practical purposes, and hardens on the moist surface to form a coating covering over the cracks without forming blisters or other structural irregularities. The following mechanical properties characterize the coating:

| Elongation at break | according to DIN 53 455 | 800% |
| --- | --- | --- |
| Tensile strength | according to DIN 53 455 | 24 N/mm$^2$ |
| Tear propagation resistance | according to DIN 53 515 | 30 N/mm$^2$ |

EXAMPLE 2

This example illustrates the accelerating effect of a carboxylic acid anhydride on the complete process of hardening of the coating of Example 1. The amount of acid anhydride was varied from 0.2 to 1.0, based on the whole mixture. As a measure of the speed of hardening, the Shore hardness is determined 5 hours after application of the coating compound. The results are shown in the following Table. Working time and Shore hardness A determined as functions of the amount of methylhexahydrophthalic acid anhydride added.

| % Addition | Working time (minutes) | Shore A hardness after 5 hours |
| --- | --- | --- |
| 0.0 | 30 | 15 |
| 0.2 | 27 | 36 |
| 0.4 | 25 | 50 |
| 0.6 | 23 | 54 |
| 0.8 | 22 | 60 |
| 1.0 | 20 | 62 |

As may be seen from the figures, the speed of hardening is doubled and the pot life is insubstantially reduced by the addition of 0.2%.

EXAMPLE 3

(Comparison)

A concrete panel measuring 50×20×1.5 cm is immersed in water and after it has been left to allow the water to drip off, a mixture of 200 g of isocyanate component B, 11.5 g of triethylene glycol, 5 g of zeolite powder as drying agent and 0.05 g of dibutyl tin dilaurate is poured over the panel. The mixture remains in a workable condition for ca. 60 minutes but compared with Example 1 it hardens with the formation of a large number of blisters and is unsuitable for use as a coating required to bridge over the cracks.

Although the invention has been described in detail in the foregoing for the purpose of illustration it is to be understood that such detail is solely for that purpose and that variations can be made therein by those skilled in the art without departing from the spirit and scope of the invention except as it may be limited by the claims.

EXAMPLE 4

100 g of isocyanate component A is admixed with a separate mixture which has been obtained by mixing 100 g of coal tar, 50 g of aluminum silicate, 10 g of 1-methyl-3,5-diethyl-2,4-diamino-benzene and 25 g of isocyanate component B and storage of the reaction mixture for 30 minutes.

A concrete panel measuring 50×20×1.5 cm is immersed in water and after it has been left to allow the water to drip off above reaction mixture is poured over the panel. The mixture remains in a workable condition for about 90 minutes and hardens without formation of any blisters. The following mechanical properties characterise the coating:

| | |
|---|---|
| Elongation at break according to DIN 53455 | 700% |
| tensile strength according to DIN 53455 | 5 N/mm² |
| tear propagation resistance according to DIN 53515 | 15 N/mm |

What is claimed is:

1. A process for the production of elastic coatings by coating any substrates with a solvent-free or low solvent coating composition, containing, as binder, a two-component system of (i) a polyisocyanate component and (ii) a hardener component, characterized in that
   (i) has an isocyanate content of from 1 to 20% by weight and comprises of at least one prepolymer containing free isocyanate groups based on 1-isocyanato-3,3,5-trimethyl-5-isocyanatomethylcyclohexane and one or more polyalkylene ether polyols having an (average) hydroxyl functionality of from 2 to 3,
   (ii) comprises to an extent of at least 50 equivalent percent of polyamines selected from the group consisting of (a) at least one diprimary aromatic diamine having at least one alkyl substituent with 2 to 3 carbon atoms in an ortho-position to each amino group and optionally also methyl substituents in further ortho-positions to the amino groups, (b) reaction products of such diamines with a subequivalent amount of either a prepolymer containing free isocyanate groups based on an organic diisocyanate having a molecular weight of from 168 to 300 and at least one polyalkylene ether polyol having an (average) hydroxyl functionality of 2 to 3 or of a mixture of such a prepolymer with up to 500 isocyanate equivalent percent, based on the isocyanate groups of said prepolymer, of said diisocyanate and (c) mixtures of (a) and (b) and to an extent of up to 50 equivalent percent of dihydric or trihydric alcohols having primary hydroxyl groups
and in that (i) and (ii) being used in quantitative proportions corresponding to an NCO/NH₂ equivalent ratio in the range of from 0.5:1 to 1.5:1.

2. The process of claim 1, further characterized in that from 0.1 to 5% by weight, based on the sum of (i)+(ii), of a carboxylic acid anhydride are incorporated in said coating composition.

3. The process of claim 1 wherein said low solvent coating composition contains up to 15% of lacquer solvents, said percent being relative to the weight of the coating.

4. A process for coating moist concrete comprising preparing a mixture of (i) a polyisocyanate component and (ii) a hardener component wherein
   (i) has an isocyanate content of from 1 to 20% by weight and comprises of at least one prepolymer containing free isocyanate groups based on 1-isocyanato-3,3,5-trimethyl-5-isocyanatomethylcyclohexane and one or more polyalkylene ether polyols having an (average) hydroxyl functionality of from 2 to 3, and wherein
   (ii) comprises to an extent of at least 50 equivalent percent of polyamines selected from the group consisting of (a) at least one diprimary aromatic diamine having at least one alkyl substituent with 2 to 3 carbon atoms in an ortho-position to each amino group and optionally also methyl substituents in further ortho-positions to the amino groups, (b) reaction products of such diamines with a subequivalent amount of either a prepolymer containing free isocyanate groups based on an organic diisocyanate having a molecular weight of from 168 to 300 and at least one polyalkylene ether polyol having an (average) hydroxyl functionality of 2 to 3 or of a mixture of such a prepolymer with up to 500 isocyanate equivalent percent, based on the isocyanate groups of said prepolymer, of said diisocyanate and (c) mixtures of (a) and (b) and to an extent of up to 50 equivalent percent of dihydric or trihydric alcohols having primary hydroxyl groups
and wherein (i) and (ii) are used in quantitative proportions corresponding to an NCO/NH₂ equivalent ratio in the range of from 0.5:1 to 1.5:1, and applying said mixture to the moist concrete surface before it has reacted sufficiently to have lost its fluidity.

* * * * *